A. FAY.
METHOD FOR PRODUCING BUTTER.
APPLICATION FILED MAR. 1, 1915.

1,210,782.

Patented Jan. 2, 1917.
2 SHEETS—SHEET 2.

UNITED STATES PATENT OFFICE.

ALPHEUS FAY, OF LOUISVILLE, KENTUCKY.

METHOD FOR PRODUCING BUTTER.

1,210,782.                     Specification of Letters Patent.        Patented Jan. 2, 1917.

Application filed March 1, 1915.   Serial No. 11,355.

*To all whom it may concern:*

Be it known that I, ALPHEUS FAY, a citizen of the United States, and a resident of Louisville, in the county of Jefferson and the State of Kentucky, have invented a certain new and useful Method for Producing Butter, of which the following is a specification.

The object of my invention is to provide a novel process of steps that leads to a permanent result for producing butter at a greater altitude of development.

My invention consists of operating centrifugally and centripetally upon a body of cream elements in such a manner that the proportion of vertical pressure and the impact within the body of cream elements and the consequent disruptive agitation are minimized and the proportion of aeration, centrifugal and centripetal action therein are maximized by virtue of operating in a body of cream elements with its depth minimized and its diameter maximized, equally distributing all of the forces to operate uniformly throughout the body of cream elements to produce butter at a greater altitude of development.

My invention consists in the details of operation hereinafter more fully set forth and claimed.

Figure 1:
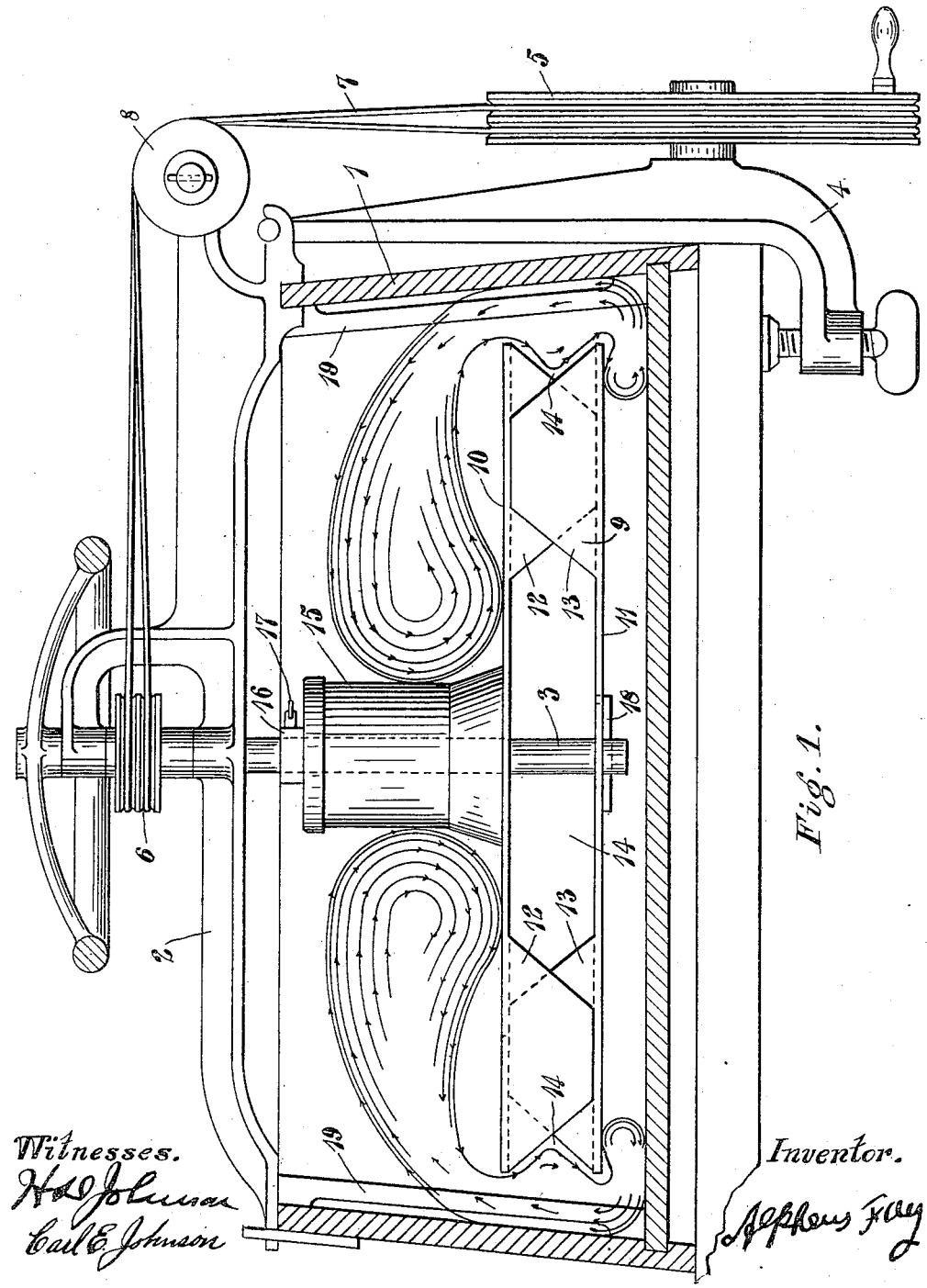
Figure 2:
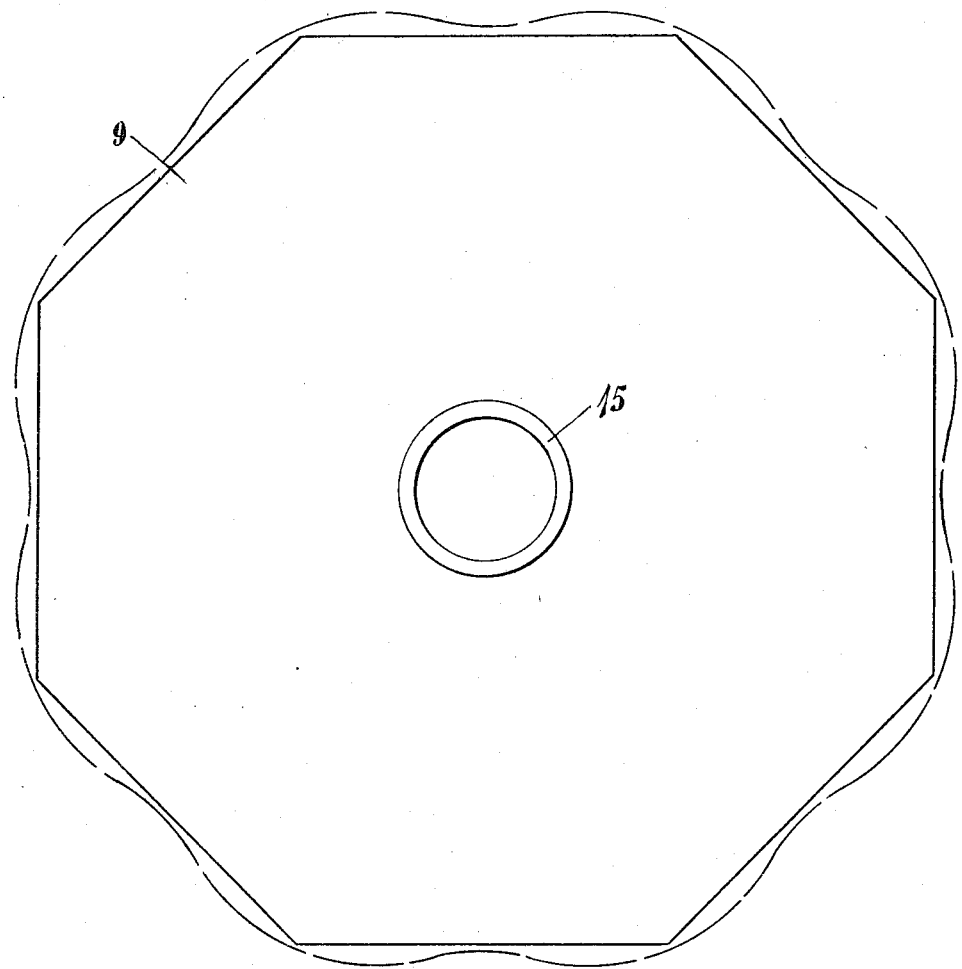

In the drawings, Figure 1 is a sectional elevation of apparatus suitable for carrying out my method. Fig. 2 is a diagram showing the action of the apparatus at low speed.

The apparatus here shown comprises a vessel 1 of wide and low formation, with its diameter greater than its depth, across which extends a bracket 2 with a vertical shaft 3 journaled in it, the bracket being mounted across the top of the vessel and being held down on the vessel by a clamping arm 4 which engages under the table or through the object on which the other apparatus is supported, and this holds the entire apparatus down. A driving wheel 5 is mounted on this bracket and the shaft 3 has a pulley 6 while the belt 7 passes around this wheel and pulley and over idler pulleys 8 for driving the shaft 3.

Mounted on the shaft 3 is an impeller 9 composed of an upper member 10 and a lower member 11, which have parts 12 and 13 bent downwardly and upwardly, respectively, which engage together and form closed sides of the impeller alternating with open spaces 14, which open spaces, due to the inclination of the sides 12 and 13, are of elongated polygonal formation. A tubular shaft 15 connects with the space between the members 10 and 11 around the shaft 3 in the center and is held downward by a hub 16, and screw 17 on the shaft 3 at the top, while the impeller members 10 and 11 are held up on the shaft 3 by a pin 18 in the bottom of the shaft 3.

The impeller above described with the alternating closed and open sides as described is very suitable to cause minute vibrations of the liquid around the periphery of the impeller as it is rotated while submerged in the liquid, but the important feature of the impeller is the uninterrupted surface both on the upper and lower sides of the upper impeller 10 and on the upper and lower sides of the lower member 11. It will therefore be understood that any suitable impeller with its diameter greater than the depth of the body of cream elements in which it is submerged having substantially plane surfaces without interruption, such as blades or fans or paddles, is suitable for operation according to my invention. Also while the tubular shaft is provided to admit air down to the space between the two members it will be understood that the operation of any suitable impeller having sufficiently uninterrupted surface to permit ample centrifugal action without too much agitation the aeration will be sufficient even without special means to take the air down into the liquid. With the mechanism shown, the air will not only travel down through the interior of the tubular shaft but will pass down outside it to the upper side of the impeller.

When the liquid is thrown out by the centrifugal action of the impeller it engages with the inner wall of the vessel and to prevent whirling of the liquid around with the impeller suitable brakes 19 are provided in the interior of the vessel close to the walls and held down against the bottom of the vessel by the bracket 2.

The impeller is located near the bottom of the vessel and the vessel as shown in the drawing is filled about two thirds full of cream so that the impeller occupies a position about midway of the depth of the liquid or a little lower as indicated in the drawing. When the impeller is rotated and the liquid is thrown outward and upward it will rise in the vessel above its normal level in a smooth roll falling inward toward the center as indicated by the upper arrows, at this time almost completely filling the vessel. The hollow shaft 15 is made high enough to come above the upper surface of the liquid at the highest point during its operation.

The use of the plane impeller depending for centrifugal action on the surrounding cream entirely upon the frictional contact of said cream with the plane surface of the impeller and where the diagonal sides 12 and 13 are used upon the slight angular engagement of these sides with the adjacent cream marks a distinct departure in the art of constructing and operating apparatus to act centrifugal and centripetal upon cream for the separation of butter therefrom. Thus arranged when the impeller is rotated the cream in contact therewith is thrown along the plane of the upper and lower surfaces of the impeller outward in every direction and is also thrown away from the diagonal sides of the members as shown in Fig. 2. The walls of the liquid around the periphery of the impelling member is of a V-shape serpentine formation, as shown in Figs. 1 and 2. The centrifugal action along the plane surfaces of the members will cause a reduction of pressure of the cream in the central regions around the shaft 3 inside of the wheel shaft 15 and also around the outside of the wheel shaft 15 with the result that atmospheric air under atmospheric pressure will pass downwardly into the liquid in such central regions until it reaches the upper surfaces of the impeller where it will be carried outward along with the liquid that is thrown outward by this centrifugal action. The cream thrown out by the lower surfaces of the members mingles in the regions around the peripheries of the members with the liquid thrown out by the upper surfaces of the members and with the air carried along by said liquid. The tendency of these currents of liquid and air is upward adjacent to the walls of the vessel and the brakes 19 will prevent whirling of the liquid in the vessel and so modify the direction of the liquid and air currents that a continuous smooth inflow and steady roll of the expanded and rarefied liquid will occur all around the vessel as shown in Fig. 1. Owing to the absence of impact by the impeller, the nature of the liquid and air currents will be such that their contact with the brakes will not result in any violent agitation. On the contrary, the application of the forces to the liquid and air is so steady and smooth that an extremely uniform distribution of the forces and air throughout the body of the liquid is effected. This uniform action throughout the liquid is comparable to the uniform activity of a body of liquid undergoing a gentle boiling process caused by heat applied to the liquid. I have discovered that such a uniform distribution of the forces throughout a liquid produces through ebullition, without the use of heat.

The result of operation according to my method is to produce the above described true ebullition; and as near as I have been able to determine, this true ebullition is the manifestation of a huge number of vibrations, the result of a huge number of distinct and minute currents of infinitesimal elements of energy very uniformly distributed throughout the body of milk or other liquid. These vibrations separate the butter or fatty elements causing the non-fatty elements to divide and go into minute suspension or solution with the water of the milk or other liquid; or else to remain in such minute suspension or solution in the water as they were in the original milk or other liquid; and causing the fatty elements to form into visible or palpable bodies in the form of crystals or granules of about the size and shape of coarse grains of salt.

On account of the exceedingly minute divisions of the distribution of the forces throughout the liquid body, and the uniformity of the distribution, these changes are harmoniously brought about in an exceedingly short space of time, as herein described. The wide difference between the nature of this operation and that of ordinary churning or separating operation, either without aeration or with inferior and practically negligible aeration, is indicated by the great difference in time required to bring about these changes as regards my invention compared to other methods herein alluded to, as well as by the marked increase in purity of the product and the increase in proportion of fatty elements recovered, as will be more fully pointed out herein. Processes of separating butter from the other milk elements have always involved some kind of violent agitation; and, where aeration was resorted to, the means and methods employed were such that the aeration obtained was practically negligible owing to lack of uniform application. I minimize the agitation and the vertical pressure and maximize the aeration and centrifugal force so that the proper proportion of vertical pressure, aeration, agitation, centrifugal and centripetal force is obtained, with the result that true ebullition is obtained without the application of heat.

Forcing air through a liquid by the action of a pump or blower has more the effect of mechanical agitation than it does of aeration, and cannot be described as true ebullition for this reason, and also for the reason that the distribution of all the forces throughout the liquid will not be uniform. With my method, involving centrifugal and centripetal action without impact, the entrance of the air into the liquid is caused merely by the atmospheric pressure, and the action is such that the air entering under this pressure is brought into contact with practically every particle of the liquid during the operation. This, in conjunction with all the other forces acting uniformly on the liquid, produces true ebullition. With the same volume of liquid placed in a deep vessel or a shallow vessel, and the diameter of the shallow vessel being such that the liquid will be about half the depth of that in the deep vessel the energy required to churn the cream is about one-fourth that in the shallow vessel to what would be required to do the same work in the deep vessel, and the result attained will be better, namely, better butter and more butter than can be made in the deep body of liquid. The butter which is made by revolving a disk in a shallow body of cream will not become rancid as soon as butter made in the ordinary way, because the small globules of butter fat have not broken up and the other ingredients of the milk which cause butter to become rancid would have been kept separated from the butter-fat globules.

The friction of the disks revolving in a liquid is directly proportional to the area of rubbing surface; the energy required is proportional to the resistance overcome. According to my method the liquid depth must be such that the force applied will be uniformly distributed throughout the entire body of liquid. When a disk revolves in a liquid that has its depth several times greater than its diameter the liquid immediately in contact with the disk, and for a very limited distance from the disk, may be affected; but the main body of the liquid will not be acted upon. In the shallow body of liquid, which has a diameter greater in proportion to its depth, the vertical pressure on the disk is slight, and all the liquid in turn being in true contact with the disk, the forces applied are utilized in the most efficient manner possible.

The peripheral speed of my disks is always the same, approximating about eleven hundred and fifty feet per minute. I have found by revolving disks in cream of different depths that the same disk revolving in shallow cream will produce more butter, better butter, and make it in less time.

In the shallow body of liquid, the energy applied through the disk to the liquid is equally distributed through the entire body; but in the deep body of liquid the forces are not equally distributed. Therefore the efficiency is less in the deep body of liquid; and owing to the relation between the disk and the deep body of liquid it is impossible to ever attain the same efficiency in a deep body of liquid as in a shallow body by my process, and if the body of liquid is very deep in proportion to the diameter no perceptible effect would be produced upon it.

In two vessels containing the same quantity of liquid, one having its height twice that of the other, and the shallow one having its diameter increased so that half the height will cause it to contain the same amount of liquid as the tall vessel, and my disk is revolved in the shallow body of liquid, the energy required to operate the disk of greater diameter will be about one-fourth that required to operate the disk of lesser diameter; the peripheral speed of the disk being the same. To operate my device at the greatest efficiency, the depth of the liquid must have the right relation to the diameter. For example, a vessel of 7″ diameter and 12″ high, inside measurement, would contain about 2 gals., and a vessel 9⅞″ diameter and 6″ high, inside measurement, will contain about two gallons. Now, if I place one of my disks 6″ in diameter in the vessel which is 12″ high and submerge it in a liquid within the vessel 6″ from the top and place one of my disks 8⅞″ diameter in a liquid within the vessel which is 6″ high 3″ from the top, and both disks are revolved so that the peripheral speed of each disk is the same, the energy required to operate the large disk will be about one quarter that for operating the small disk, and the results obtained would be far superior. This action, although familiar as obtained by the action of heat on a liquid, could not be utilized in the treating of cream elements to obtain butter were it necessary to apply heat to the liquid sufficient to boil.

For separating butter from either sweet or sour cream, the liquid is placed in the vessel, with the impeller about midway of the depth of the liquid as shown. It is important that the depth of the liquid above the impeller disk be not too great; otherwise the entrance of the air under atmospheric pressure will be hindered. It is also important that the distance between the impeller and the bottom of the vessel be not too great, because any considerable quantity of liquid too far below the impeller will not be affected by the aeration and other forces acting upon it, and will not have the butter separated from it, but will merely serve as a collecting place for the butter separated from the upper liquid. On the other hand it is highly desirable that the impeller disk be of considerable diameter in order to obtain the greatest amount of centrifugal action without impact and to operate on as large a quantity of liquid as is desired. For this reason the proper disposition of the body of liquid will be such that its width is considerably greater than its depth, as illustrated in the drawing and it is for this reason that the vessel is made wide and low so that it is possible for all the forces applied to the liquid to act upon it in a uniform manner.

The milk elements should not have their temperature too low or too high, about 55 or 60 Fahrenheit being the preferred temperature. Such temperature is high enough to allow the operation to be performed quickly, and it is not so high as to cause the resulting butter granules to be too soft. With this method butter may be produced in from three to ten minutes. Perceptible accumulation of butter will practically all take place during the last 15 or 60 seconds of the operation. The butter will form in granules, and then the residue may be drawn off from the vessel and the granules salted by agitation and aeration of brine with the granules in the vessel. When the salting operation is completed, the butter granules may be removed from the brine in the vessel, or the brine may be withdrawn from the butter granules, and the granules then removed from the vessel, after which the granules are worked or pressed into consistency for use. The efficiency of operation is such that fully 90% of the butter fat of the cream is removed, and butter of purity of over 99% is obtainable, of firm texture and natural flavor.

Applicant believes that he is the first inventor to discover and make manifest to humanity the functions of minute currents of infinitesimal elements of harmonic forces of energy, producing huge numbers of harmonic vibrations, operating upon a body of cream elements in a container with its diameter greater than its depth, with a rotatable member with its diameter greater than its thickness, minimizing the vertical pressure and the impact and maximizing the aeration and the centrifugal and the centripetal action operating upon a body of cream elements with its diameter greater than its depth.

I have shown and described a novel process of steps that leads to a permanent result for producing butter at a greater altitude of developement.

What I claim and desire to secure by Letters Patent is:

1. The method of producing butter which consists in causing circular and radial vibratory currents in a body of cream elements by the rotation therein of an impeller disk shaped to give minimum impact to the cream elements of the mass to produce such a difference in the vibration of the cream elements as to bring about a uniform and coincident separation of the butter globules.

2. The method of producing butter which consists in causing circular and radial vibratory currents in a body of cream elements by the rotation therein of an impeller disk, the depth and diameter of the said body of cream elements being so proportioned with respect to the pitch and the diameter of the impeller disk as to produce uniform changes in the rate of vibration, the said impeller disk being so shaped as to give minimum impact to the cream elements to produce such vibration of the cream elements as to bring about a uniform and coincident separation of the butter globules.

3. The method of producing butter which consists in causing radial and circular vibratory currents in a body of cream elements, said cream elements being confined in a space the diameter of which is a substantial multiple of the depth thereof, the surface of said cream elements being at all times free to be moved by the rotation therein of an impeller disk shaped to give minimum impact to the cream elements as to bring about a uniform and coincident separation of the butter globules.

ALPHEUS FAY.

Witnesses:
CARL E. JOHNSON,
H. D. JOHNSON.